(12) United States Patent
Yoshida (10) Patent No.: US 11,240,603 B2
(45) Date of Patent: Feb. 1, 2022

(54) SPEAKER APPARATUS, AUDIO DATA SUPPLY APPARATUS, AND AUDIO DATA REPRODUCTION SYSTEM

(71) Applicant: SONY CORPORATION, Tokyo (JP)

(72) Inventor: Fumito Yoshida, Chiba (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/494,834

(22) PCT Filed: Feb. 5, 2018

(86) PCT No.: PCT/JP2018/003723
§ 371 (c)(1),
(2) Date: Sep. 17, 2019

(87) PCT Pub. No.: WO2018/179835
PCT Pub. Date: Oct. 4, 2018

(65) Prior Publication Data
US 2020/0084547 A1 Mar. 12, 2020

(30) Foreign Application Priority Data
Mar. 29, 2017 (JP) .............................. JP2017-064190

(51) Int. Cl.
*H04R 5/04* (2006.01)
*G01S 11/14* (2006.01)
(Continued)

(52) U.S. Cl.
CPC ................ *H04R 5/04* (2013.01); *G01S 11/14* (2013.01); *H04R 3/00* (2013.01); *H04R 29/001* (2013.01)

(58) Field of Classification Search
CPC ........ G01S 11/14; G01S 17/42; H04R 29/001; H04R 3/00; H04R 5/04; H04R 1/403;
(Continued)

(56) References Cited

U.S. PATENT DOCUMENTS

| 4,481,593 A * | 11/1984 | Bahler | ................... G10L 15/05 |
| | | | 704/253 |
| 2007/0058820 A1* | 3/2007 | Sawara | ................... H04R 27/00 |
| | | | 381/82 |

(Continued)

FOREIGN PATENT DOCUMENTS

| CN | 101881611 | 11/2010 |
| CN | 106162444 | 11/2016 |

(Continued)

OTHER PUBLICATIONS

International Search Report prepared by the Japan Patent Office dated Apr. 5, 2018, for International Application No. PCT/JP2018/003723.

(Continued)

*Primary Examiner* — Lun-See Lao
(74) *Attorney, Agent, or Firm* — Sheridan Ross P.C.

(57) ABSTRACT

A speaker apparatus includes a measuring unit configured to measure a first distance to a detection object, the detection object existing on one side in a vertical direction substantially orthogonal to a sound radiation direction, and a second distance to a detection object, the detection object existing on another side in the vertical direction.

13 Claims, 8 Drawing Sheets

(51) Int. Cl.
*H04R 3/00* (2006.01)
*H04R 29/00* (2006.01)

(58) Field of Classification Search
CPC .............. H04R 1/406; H04R 2201/403; H04R 2201/405; H04R 27/00; H04R 1/06; H04R 2420/07; H04R 5/02; H04S 7/301; H04S 2400/05; H04S 2400/11; H04S 2400/13; H04S 2420/01; H04S 5/005; H04S 7/00; H04S 7/303; H04S 7/307
USPC ..................... 381/56–59, 1, 17, 18
See application file for complete search history.

(56) References Cited

U.S. PATENT DOCUMENTS

| | | | | |
|---|---|---|---|---|
| 2007/0273790 | A1* | 11/2007 | Sakata | H01L 27/14625 348/552 |
| 2014/0126753 | A1* | 5/2014 | Takumai | H04R 5/04 381/303 |
| 2015/0181388 | A1 | 6/2015 | Smith | |
| 2015/0264502 | A1* | 9/2015 | Aoki | H04S 7/307 381/17 |
| 2015/0373452 | A1* | 12/2015 | Kubota | G06F 3/165 381/97 |
| 2018/0192196 | A1* | 7/2018 | Gunnarsson | H04S 7/301 |

FOREIGN PATENT DOCUMENTS

| | | | |
|---|---|---|---|
| JP | 2007-243563 | 9/2007 | |
| JP | 2012-029096 | 2/2012 | |
| JP | 2016-005016 | 1/2016 | |
| WO | WO 2008/144264 | 11/2008 | |
| WO | WO 2015/147737 | 10/2015 | |
| WO | WO2015147737 | * 10/2015 | ............... H04R 5/04 |

OTHER PUBLICATIONS

Official Action for China Patent Application No. 201880019629,7, dated Jul. 5, 2021, 10 pages.

* cited by examiner

SPEAKER APPARATUS, AUDIO DATA SUPPLY APPARATUS, AND AUDIO DATA REPRODUCTION SYSTEM

CROSS REFERENCE TO RELATED APPLICATIONS

This application is a national stage application under 35 U.S.C. 371 and claims the benefit of PCT Application No. PCT/JP2018/003723 having an international filing date of 5 Feb. 2018, which designated the United States, which PCT application claimed the benefit of Japanese Patent Application No. 2017-064190 filed 29 Mar. 2017, the entire disclosures of each of which are incorporated herein by reference.

TECHNICAL FIELD

The present disclosure relates to a speaker apparatus, an audio data supply apparatus, and an audio data reproduction system.

BACKGROUND ART

Conventionally, a system that detects a relative position of a speaker apparatus has been proposed (see, for example, Patent Document 1).

CITATION LIST

Patent Document

Patent Document 1: Japanese Patent Application Laid-Open No. 2011-4077

SUMMARY OF THE INVENTION

Problems to be Solved by the Invention

A speaker apparatus can be used at various positions in a height direction of a space. Therefore, it is desirable to be able to detect the position of the speaker apparatus in the height direction.

Therefore, one object of the present disclosure is to provide a speaker apparatus capable of detecting a position of the speaker apparatus in a height direction, an audio data supply apparatus, and an audio data reproduction system.

Solutions to Problems

The present disclosure is, for example,
a speaker apparatus including a measuring unit configured to measure a first distance to a detection object, the detection object existing on one side in a vertical direction substantially orthogonal to a sound radiation direction, and a second distance to a detection object, the detection object existing on another side in the vertical direction.

The present disclosure is, for example,
an audio data supply apparatus including:
an audio data processing unit configured to subject audio data to sound quality adjustment processing according to positional information sent from a speaker apparatus; and
a supply unit configured to supply the audio data subjected to the sound quality adjustment processing, to a corresponding speaker apparatus by communication,
in which the positional information is information based on a first distance to a detection object, the detection object existing on one side in a vertical direction substantially orthogonal to a sound radiation direction of the speaker apparatus, and a second distance to a detection object, the detection object existing on another side in the vertical direction.

The present disclosure is, for example,
an audio data reproduction system including: a speaker apparatus; and an audio data supply apparatus configured to supply audio data to the speaker apparatus,
in which the speaker apparatus includes
a measuring unit configured to measure a first distance to a detection object, the detection object existing on one side in a vertical direction substantially orthogonal to a sound radiation direction, and a second distance to a detection object, the detection object existing on another side in the vertical direction, and
a communication unit configured to send positional information based on the first distance and the second distance to the audio data supply apparatus by communication, and
the audio data supply apparatus includes
an audio data processing unit configured to subject the audio data to sound quality adjustment processing according to the positional information sent from the speaker apparatus, and
a supply unit configured to supply the audio data subjected to the sound quality adjustment processing to a corresponding speaker apparatus by communication.

Effects of the Invention

According to at least one embodiment of the present disclosure, the position of the speaker apparatus in the height direction can be detected. Note that the effects described herein are not necessarily limited, and any one of the effects described in the present disclosure may be exerted. Furthermore, the contents of the present disclosure are not to be interpreted as being limited by the exemplified effects.

MODE FOR CARRYING OUT THE INVENTION

Hereinafter, embodiments and the like of the present disclosure will be described with reference to the drawings. Note that the description will be given in the following order.

1. First Embodiment
2. Second Embodiment
3. Modification Examples

The embodiments and the like described below are preferred specific examples of the present disclosure, and the contents of the present disclosure are not limited to these embodiments and the like.

1. First Embodiment

[Configuration Example of Audio Data Reproduction System]

Figure 1:
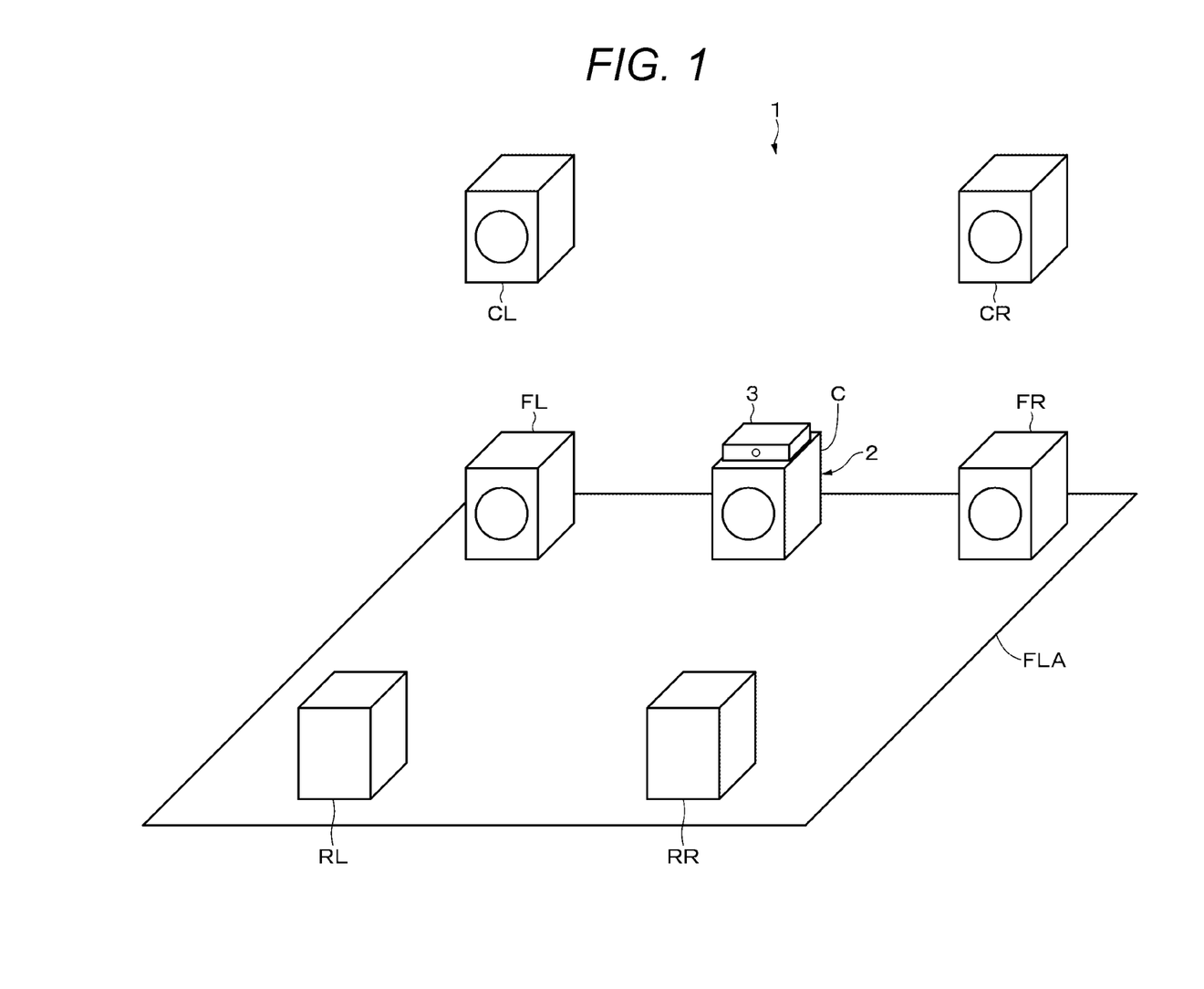
FIG. 1 is a diagram showing a configuration example of an audio data reproduction system according to a first embodiment.

FIG. 1 shows a configuration example of an audio data reproduction system (audio data reproduction system 1) according to a first embodiment of the present disclosure. The audio data reproduction system 1 shown in FIG. 1 has a speaker arrangement called 5.1.2 channel and is a system having two speaker apparatuses attached a ceiling face in addition to speaker apparatuses arranged on the basis of a known 5.1 channel.

Center (C), front right (FR), front left (FL), rear right (RR) and rear left (RL) are allocated to five speaker apparatuses 2 placed on a floor face FLA as arrangement positions thereof. Furthermore, in the present embodiment, of the two speaker apparatuses attached to the ceiling, CR is allocated to a right speaker apparatus 2 as an arrangement position, and CL is allocated to a left speaker apparatus 2. Note that the speaker apparatuses 2 positioned at CR and CL may be attached to an upper side of a wall face instead of the ceiling. Each of the speaker apparatuses 2 shown in FIG. 1 has the same shape in consideration of the convenience of the explanation, but may have a different shape.

The audio data reproduction system 1 has an audio data supply apparatus 3. The audio data supply apparatus 3 is an apparatus that supplies audio data to each of the speaker apparatuses 2 and is a reproduction device that reproduces audio data recorded on, for example, a compact disc (CD), a digital versatile disc (DVD), a Blu-ray disc (registered trademark: BD) or the like. The audio data supply apparatus 3 sends the audio data to each of the speaker apparatuses 2 by wired or wireless communication. Examples of the wireless communication include Bluetooth (registered trademark) and Wi-Fi (registered trademark), and each of the apparatuses has a known configuration compatible with the communication system. Note that FIG. 1 shows an example in which the audio data supply apparatus 3 is put on the top of the speaker apparatus 2 at the position of C, but the audio data supply apparatus 3 can be put at any position as appropriate.

[Configuration Example of Speaker Apparatus]

Figure 2:
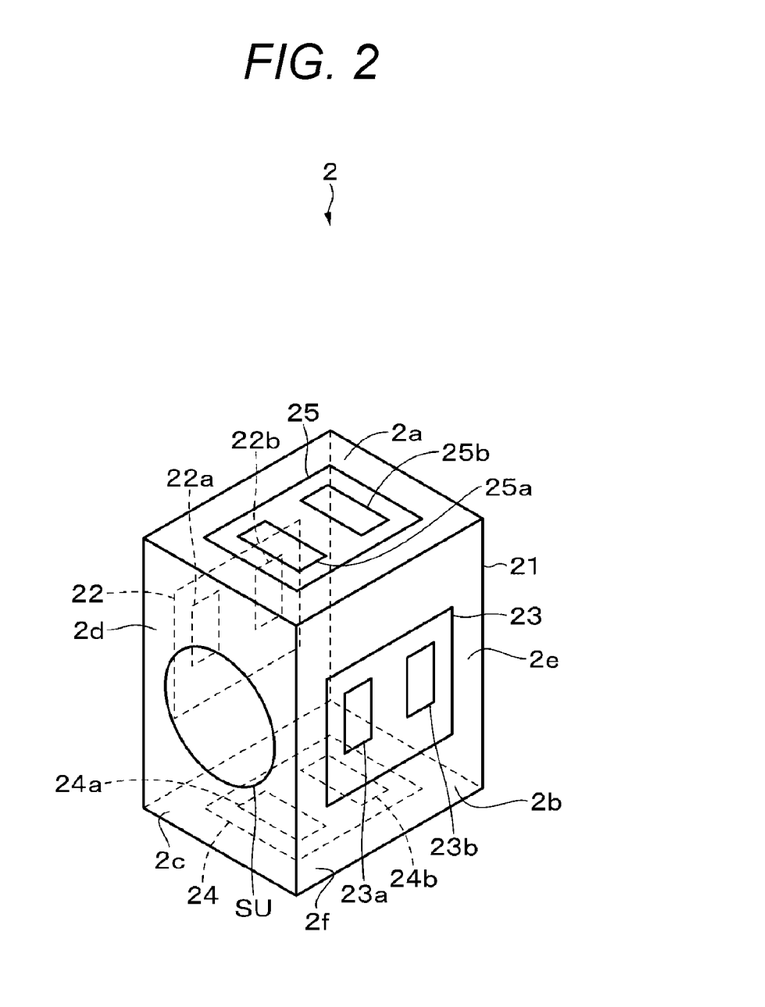
FIG. 2 is a view showing an exterior example of a speaker apparatus according to the embodiment.

FIG. 2 shows an exterior example of the speaker apparatus 2 according to the first embodiment. The speaker apparatus 2 has, for example, a rectangular parallelepiped enclosure 21. The enclosure 21 has a top face 2a, a bottom face 2b, and four side faces 2c, 2d, 2e and 2f therearound. A speaker unit SU is attached to, for example, the side face 2c of the speaker apparatus 2.

The side face 2d and side face 2f, which are side faces substantially orthogonal to the side face 2c, are provided with transmission/reception units 22 and 23, respectively. The transmission/reception unit 22 has a transmission unit 22a and a reception unit 22b. The transmission/reception unit 23 has a transmission unit 23a and a reception unit 23b. Thus, the transmission/reception units 22 and 23 have a pair of transmission and reception parts.

The transmission unit 22a outputs, for example, an infrared signal $IR_R$. The reception unit 22b receives the reflected light in which the infrared signal $IR_R$ is reflected by a detection object. The transmission unit 23a outputs, for example, an infrared signal $IR_L$. The reception unit 23b receives the reflected light in which the infrared signal $IR_R$ is reflected by a detection object.

Moreover, the bottom face 2b of the speaker apparatus 2 is provided with a transmission/reception unit 24, and the top face 2a of the speaker apparatus 2 is provided with a transmission/reception unit 25. The transmission/reception unit 24 has a transmission unit 24a and a reception unit 24b. The transmission/reception unit 25 has a transmission unit 25a and a reception unit 25b. Thus, the transmission/reception units 24 and 25 also have a pair of transmission and reception parts.

The transmission unit 24a outputs, for example, an infrared signal $IR_D$ downward from the speaker apparatus 2. The reception unit 24b receives the reflected light in which the infrared signal $IR_D$ is reflected by a detection object. The transmission unit 25a outputs, for example, an infrared signal $IR_U$ upward from the speaker apparatus 2. The reception unit 25b receives the reflected light in which the infrared signal $IR_U$ is reflected by a detection object.

The infrared signals have advantages that the infrared signals can reach the destinations by diffraction even if there are some detection objects, and the communication distance of about 7 to 10 m can be secured as in a case of a remote control apparatus using infrared signals. The infrared signals $IR_R$, $IR_L$, $IR_D$ and $IR_U$ are preferably signals that can be distinguished from each other (characterized signals). For example, each of the infrared signals is a signal that can be distinguished by the difference in carrier frequency. Each of the infrared signals may be a signal that can be distinguished by adding a predetermined identifier to each of the infrared signals.

Figure 3:
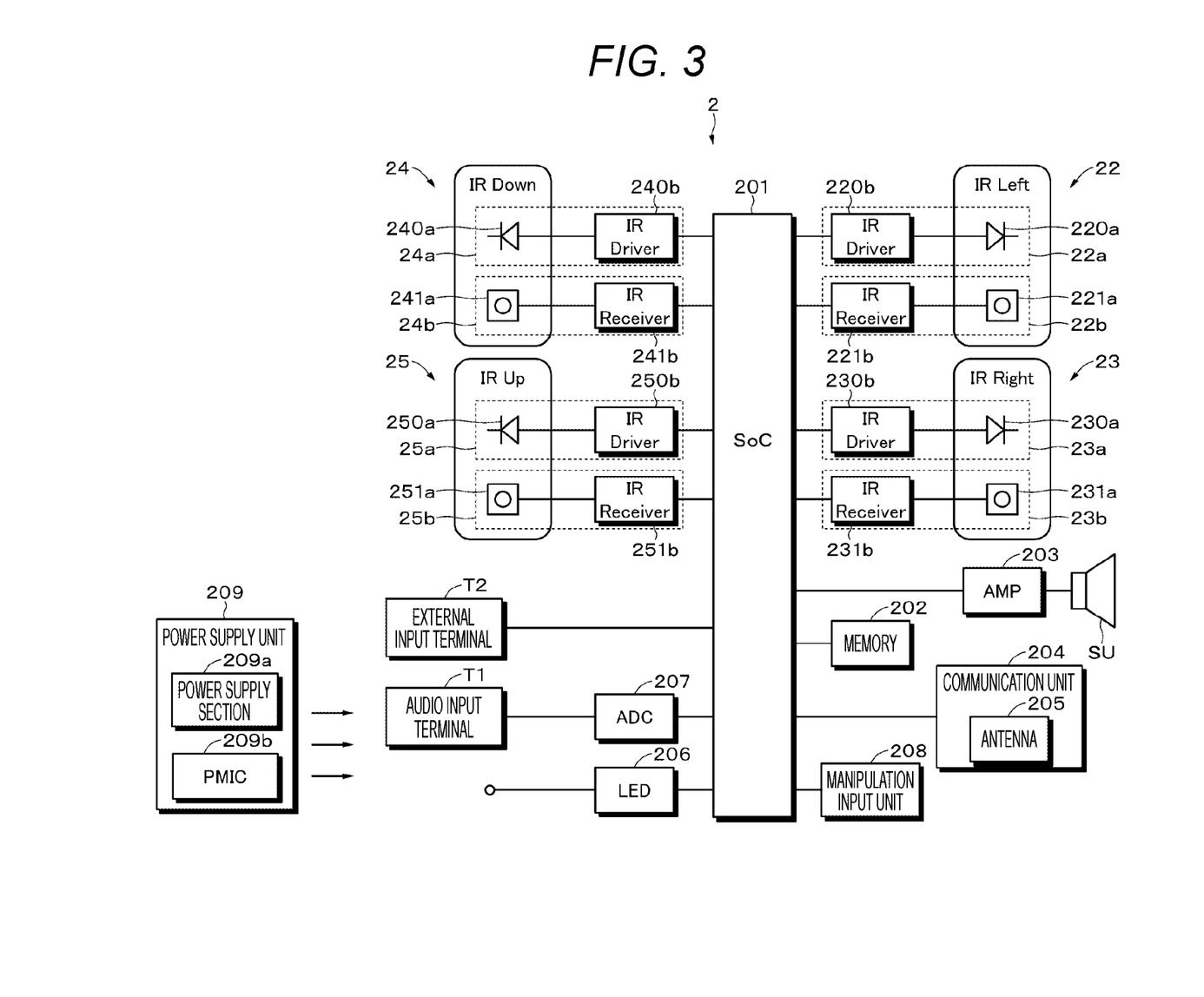
FIG. 3 is a block diagram showing a configuration example of the speaker apparatus according to the embodiment.

FIG. 3 is a block diagram showing a configuration example of the speaker apparatus 2. The speaker apparatus 2 has a system on chip (SoC) 201, a memory 202, an amplifier (AMP) 203, the speaker unit SU, the above-described transmission/reception units 22 to 25, a communication unit 204 including an antenna 205, and a light emitting diode (LED) 206, an analog to digital converter (ADC) 207, an audio input terminal T1, an external input terminal T2, a manipulation input unit 208, and a power supply unit 209.

The SoC 201 is an integrated circuit in which a microcontroller and the like are integrated on a chip of the integrated circuit, and controls each unit of the speaker apparatus 2. The SoC 201 functions, for example, as one example of an identification unit that identifies positional information regarding the speaker apparatus 2. The positional information is information based on respective distances measured by at least the transmission/reception unit 24 and the transmission/reception unit 25.

The memory 202 is a generic term for a read only memory (ROM) that stores a program executed by the SoC 201, a random access memory (RAM) used as a work area when the program is executed, and the like.

The amplifier 203 amplifies the audio data with a predetermined amplification factor. A sound corresponding to the audio data output from the amplifier 203 is reproduced from the speaker unit SU.

As described above, the transmission/reception unit 22 is constituted by the transmission unit 22a and the reception unit 22b. The transmission unit 22a has a light emitting element 220a and a driver (IR driver) 220b that controls the light emission of the light emitting element 220a. The driver 220b operates in accordance with control by the SoC 201, and the light emitting element 220a emits light with the operation of the driver 220b. The reception unit 22b has a light receiving element 221a (including a condenser lens and the like) and a receiver 221b. The receiver 221b outputs, to the SoC 201, a voltage corresponding to the light receiving position at which the reflected light is received on the light receiving face of the light receiving element 221a.

The transmission/reception unit 23 is constituted by the transmission unit 23a and the reception unit 23b. The transmission unit 23a has a light emitting element 230a and a driver (IR driver) 230b that controls the light emission of the light emitting element 230a. The driver 230b operates in accordance with control by the SoC 201, and the light emitting element 230a emits light with the operation of the driver 230b. The reception unit 23b has a light receiving element 231a (including a condenser lens and the like) and a receiver 231b. The receiver 231b outputs, to the SoC 201, a voltage corresponding to the light receiving position at which the reflected light is received on the light receiving face of the light receiving element 231a.

The transmission/reception unit 24 is constituted by the transmission unit 24a and the reception unit 24b. The transmission unit 24a has a light emitting element 240a and a driver (IR driver) 240b that controls the light emission of the light emitting element 240a. The driver 240b operates in accordance with control by the SoC 201, and the light emitting element 240a emits light with the operation of the driver 240b. The reception unit 24b has a light receiving element 241a (including a condenser lens and the like) and a receiver 241b. The receiver 241b outputs, to the SoC 201, a voltage corresponding to the light receiving position at which the reflected light is received on the light receiving face of the light receiving element 241a.

The transmission/reception unit 25 is constituted by the transmission unit 25a and the reception unit 25b. The transmission unit 25a has a light emitting element 250a and a driver (IR driver) 250b that controls the light emission of the light emitting element 250a. The driver 250b operates in accordance with control by the SoC 201, and the light emitting element 250a emits light with the operation of the driver 250b. The reception unit 25b has a light receiving element 251a (including a condenser lens and the like) and a receiver 251b. The receiver 251b outputs, to the SoC 201, a voltage corresponding to the light receiving position at which the reflected light is received on the light receiving face of the light receiving element 251a.

The communication unit 204 is configured to communicate with, for example, the audio data supply apparatus 3. The communication unit 204 performs demodulation processing, error correction processing, and the like on the audio data received by the antenna 205, and the output of the communication unit 204 is converted into audio data in analog format by an analog to digital (A/D) function of the SoC 201 and then supplied to the amplifier 203. A sound corresponding to the audio data amplified by the amplifier 203 is output from the speaker unit SU.

The LED 206 includes an LED and a driver that drives the light emission of the LED, and emits light according to an operation state of the speaker apparatus 2, information regarding the remaining level of a battery, and the like.

The ADC 207 converts the audio data input from the audio input terminal T1 from analog format into digital format. The audio input terminal T1 is a terminal into which the analog audio data is input from an external apparatus or a recording medium.

The external input terminal T2 is a terminal to which a semiconductor memory such as a universal serial bus (USB) is connected.

The manipulation input unit 208 is for instructing the speaker apparatus 2 to turn on the power supply and control audio reproduction. The manipulation input unit 208 may be a mechanical button or dial, may be a touch panel, or may have these together.

The power supply unit 209 has a power supply section 209a and a power management IC (PMC) 209b. The power supply section 209a is a power supply of the speaker apparatus 2 and is, for example, a secondary battery, such as a rechargeable lithium ion secondary battery, or a primary battery, such as a dry battery. The PMC 209b converts the voltage of the power supply section 209a into a voltage (e.g., 3.3 V or 5 V) for the constituents (e.g., SoC 201) to which the voltage is supplied. Note that the configuration of the above-described speaker apparatus 2 is one example, part of the above-described configuration may be absent, and a known constituent may be added.

[Configuration Example of Audio Data Supply Apparatus]

Figure 4:
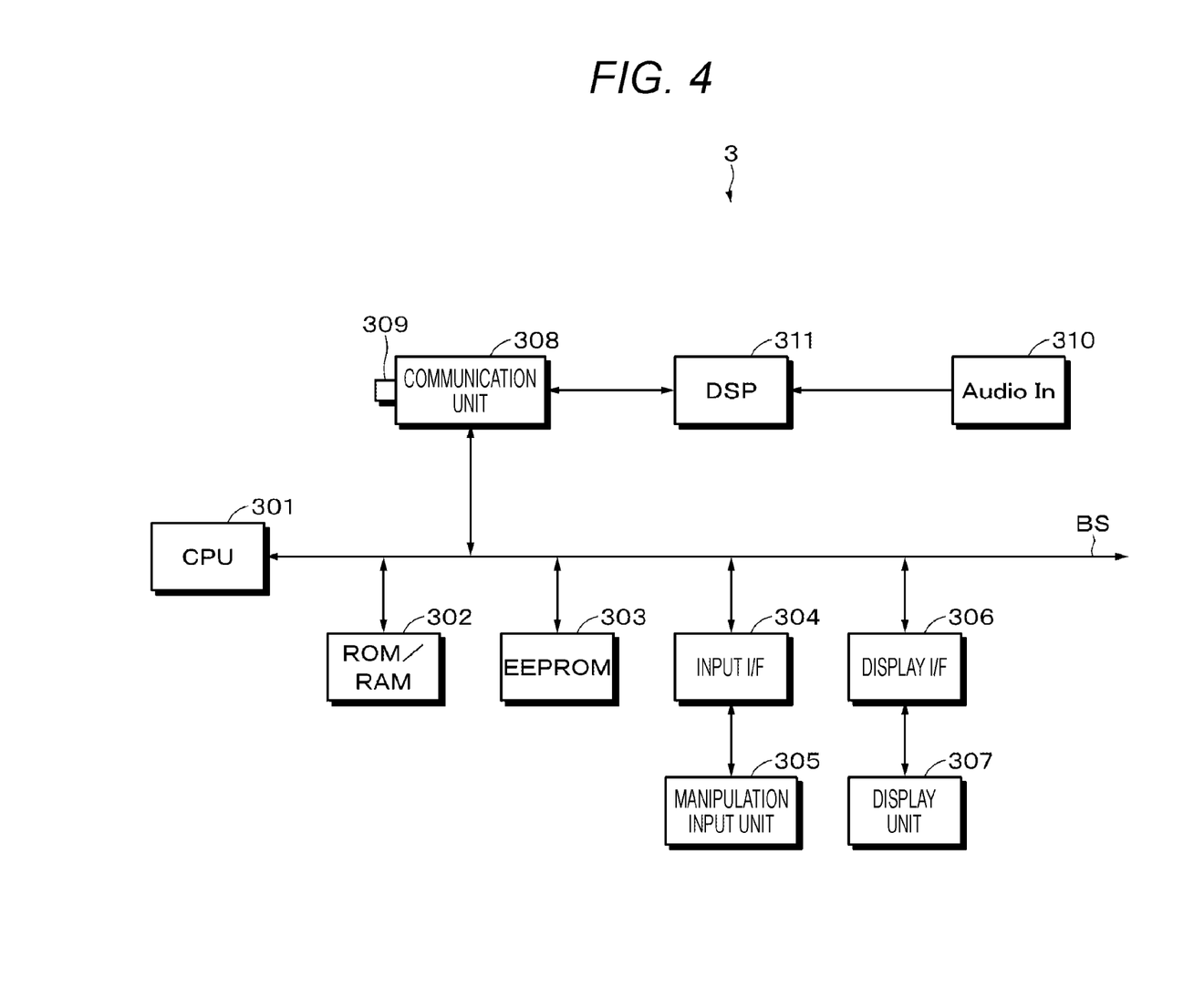
FIG. 4 is a block diagram showing a configuration example of an audio data supply apparatus according to the embodiment.

FIG. 4 is a block diagram showing a configuration example of the audio data supply apparatus 3. The audio data supply apparatus 3 has a central processing unit (CPU) 301, a ROM/RAM 302, an electrically erasable programmable read only memory (EEPROM) 303, an input interface (I/F) 304, a manipulation input unit 305, a display I/F 306, a display unit 307, a communication unit 308 which has communication input/output unit 309 such as an antenna and is one example of a supply unit, an audio input terminal (Audio In) 310, and a digital signal processor (DSP) 311. The CPU 301, the ROM/RAM 302, the EEPROM 303, the input I/F 304, the display I/F 306 and the communication unit 308 are connected to each other via a bus BS.

The CPU 301 controls each unit of the audio data supply apparatus 3. The ROM/RAM 302 is a generic term for a ROM and a RAM. The ROM stores a program executed by the CPU 301. The RAM is used as a buffer memory or the like for the audio data, in addition to being used as a work area when the CPU 301 executes the program. The EEPROM 303 stores information regarding the setting of the audio data supply apparatus 3, and the like.

The input I/F 304 is an interface for outputting a manipulation signal from the manipulation input unit 305 to the CPU 301 and the like. The manipulation input unit 305 is a generic term for the configuration that accepts the manipulation of a user by a key, a touch panel, voice, a gesture or the like. The manipulation signal is generated in response to the manipulation accepted by the manipulation input unit 305, and the generated manipulation signal is transmitted to the CPU 301 via the input I/F 304 and the bus BS. The CPU 301 executes control in accordance with the manipulation signal.

The display I/F 306 is an interface that outputs, to the display unit 307, a display control signal regarding the display. The display unit 307 performs control in accordance with the display control signal supplied via the bus BS and the display I/F 306. Examples of the display unit 307 can include a liquid crystal display (LCD) and an organic electro luminescence (EL). The display unit 307 may be configured as a touch panel, and a manipulation signal obtained by using the touch panel may be supplied to the CPU 301 via the display I/F 306.

The communication unit 308 communicates with the speaker apparatus 2 in accordance with the control of the CPU 301 and transmits the audio data to the speaker apparatus 2. The communication input/output unit 309 is an antenna or the like for performing the communication as described above.

The audio input terminal 310 is a terminal into which the audio data is input. Into the audio data input terminal, the audio data acquired from a CD, a DVD, a BD or a semiconductor memory or via the Internet or the like is input.

The DSP 311, which is one example of an audio data processing unit, performs sound quality adjustment processing on the audio data. The DSP 311 executes, for example, processing of adjusting the level of a predetermined frequency band (equalizer function) and processing relating to sound quality adjustment such as volume adjustment processing.

[Operation Example of Speaker Apparatus]

Next, an operation example of the speaker apparatus 2 will be described. The speaker apparatus 2 measures the distances to detection objects existing in the left-right direction and the up-down direction with respect to the speaker apparatus 2, for example, by applying the principle of triangulation. In a case where this measuring method is used, for example, a position sensitive detector (PSD) is used as a light receiving element of each light receiving unit. The PSD is an array of infrared detection elements.

Figure 5:
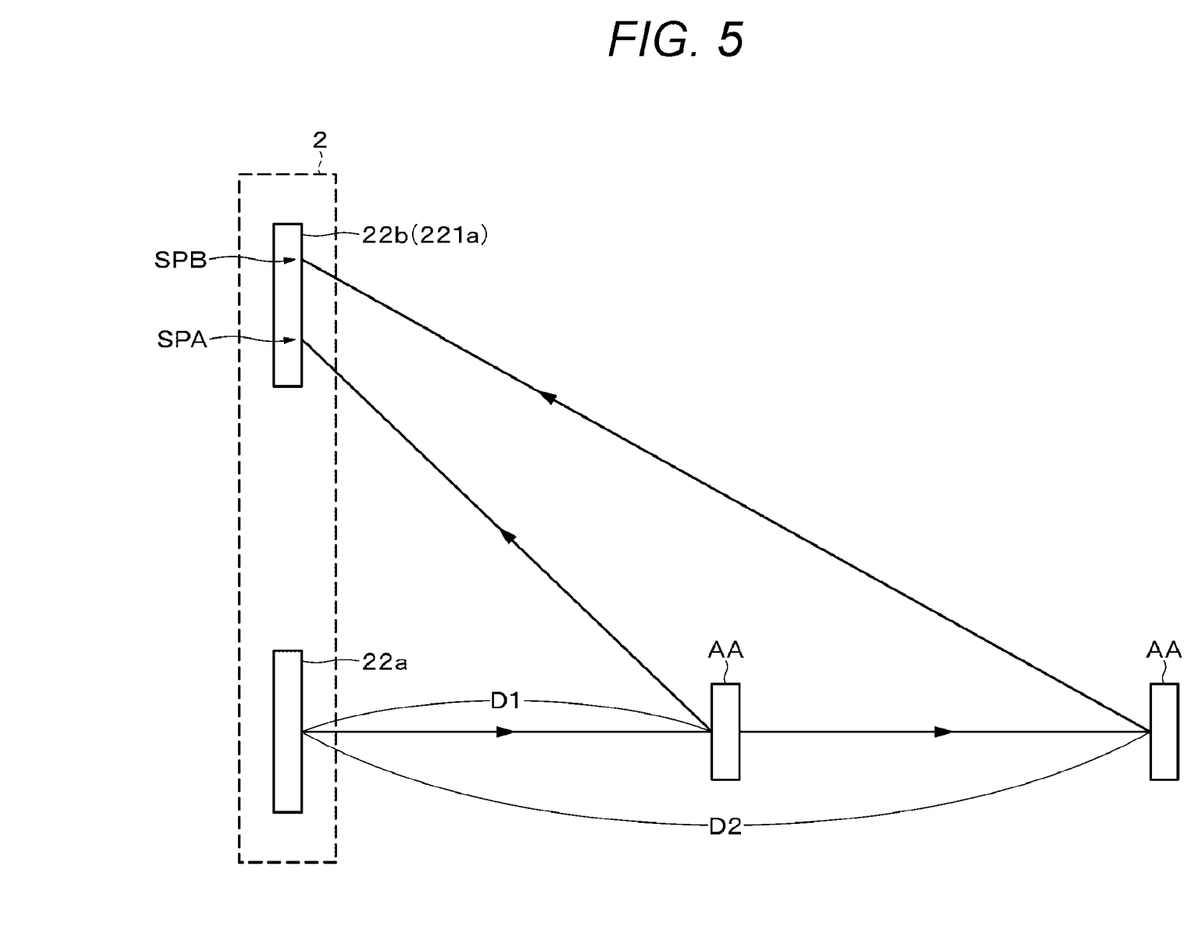
FIG. 5 is a view for explaining one example of a method of measuring a distance to a detection object.

FIG. 5 is a view for explaining one example of a method of measuring a distance to a detection object. For example, as shown in FIG. 5, considered are cases where the distance between the speaker apparatus 2 and a detection object AA is short (in a case where the distance is D1) and the distance is long (in a case where the distance is D2 (D1<D2)) when the detection object AA exists on the right side of the speaker apparatus 2 (in the direction that the transmission unit 22a outputs the infrared signal $IR_R$).

As shown in FIG. 5, a light receiving position on the light receiving element 221a that receives the reflected light from the detection object AA is different between a case where the detection object AA is at the position away from the speaker apparatus 2 by the distance D1 and a case where the detection object AA is at the position away from the speaker apparatus 2 by the distance D2. For example, the light receiving position for the reflected light in the case where the detection object AA is at the position away from the speaker apparatus 2 by the distance D1 is a light receiving position SPA. Furthermore, the light receiving position for the reflected light in the case where the detection object AA is at the position away from the speaker apparatus 2 by the distance D2 is a light receiving position SPB.

The light receiving element 221a (the PSD in this example) has a different resistance value for each element. Therefore, the voltage output from the light receiving element 221a in the case where the reflected light is received at the light receiving position SPA and the voltage output from the light receiving element 221a in the case where the reflected light is received at the light receiving position SPB have different values. The receiver 221b supplies the voltage output from the light receiving element 221a to the SoC 201. The SoC 201 converts the voltage supplied from the receiver 221b into a distance by, for example, referring to a table in which the voltage and the distance are associated to determine the distance to the detection object AA. Similarly, a voltage according to the light receiving position is also supplied from the receiver 231b to the SoC 201, and the distance to the detection object is calculated on the basis of the voltage.

The SoC 201 identifies its own arrangement position among the plurality of speaker apparatuses 2 on the basis of the distances in the left-right direction. The SoC 201 identifies its own arrangement position at a position equivalent to RL, given that a wall or the like is on the left side and another speaker apparatus 2 is on the right side, for example, in a case where the distance on the left side is several tens of centimeters and the distance on the right side is 1 m or more with the sound radiation direction being forward. Furthermore, the SoC 201 identifies its own arrangement position at a position equivalent to FL, given that a wall or the like is on the right side and another speaker apparatus 2 is at a position equivalent to C on the left side, for example, in a case where the distance on the right side is several tens of centimeters and the distance on the left side is about 50 to 60 cm with the sound radiation direction being forward. Moreover, the SoC 201 identifies its own arrangement position at a position equivalent to C, given that the speaker apparatuses 2 are on both of the sides, for example, in a case where the left and right distances are substantially equal with the sound radiation direction being forward.

Note that the method of identifying the arrangement position of the speaker apparatus 2 in the horizontal direction (left-right direction) is not limited to the above-described method, and a known method can be applied.

However, as it is, it is impossible to distinguish between the speaker apparatus put on the floor and the speaker apparatus positioned above. Therefore, in the present embodiment, for example, by utilizing the voltages obtained by the transmission/reception units 24 and 25, the arrangement position of the speaker apparatus 2 in the height direction is identified.

In a case where distance information corresponding to the voltage supplied from the receiver 241b is, for example, substantially zero, the SoC 201 identifies itself as the speaker apparatus 2 put on the floor face. In a case where the distance information is not, for example, substantially zero, the arrangement position of the speaker apparatus 2 in the height direction is identified according to the distance information corresponding to the voltage supplied from the receiver 251b. For example, in a case where the distance information is substantially zero, the SoC 201 identifies itself as the speaker apparatus 2 installed at the ceiling. In a case where there is a certain degree of distance (e.g., about 50 cm), the SoC 201 identifies itself as the speaker apparatus 2 installed at the upper side of the wall face. Thus, the arrangement position of the speaker apparatus 2 in the height direction can be identified.

As one example, a measuring unit is constituted by the transmission/reception units 24 and 25 and the SoC 201. Note that the processing of converting the voltage into the distance may be performed in each receiver, and the measuring unit is constituted by the transmission/reception units 24 and 25 in this case.

Moreover, by combining the identification results in the left-right direction, the speaker apparatus 2 can identify itself arranged at a position equivalent to CL or CR. In this manner, each of the speaker apparatuses 2 identifies the positional information as to which of the seven positions illustrated in FIG. 1 each of the speaker apparatus 2 itself is arranged. As described above, the positional information is information obtained by utilizing the distance to the detection object existing in the vertical direction (up-down direction) substantially orthogonal to the sound radiation direction. In other words, the positional information can be said to be the information based on the distances (the first distance and the second distance) to the detection objects existing in the respective directions of the vertical direction (up-down direction).

The SoC 201 controls the communication unit 204 to operate, thereby transmitting (sending) the positional information indicating the identified arrangement position to the audio data supply apparatus 3. The audio data supply apparatus 3 having received the positional information identifies the arrangement position of the speaker apparatus 2 on the basis of the positional information and selects the audio data on a channel corresponding to the arrangement position. Then, the selected audio data is transmitted to the corresponding speaker apparatus 2.

The audio data transmitted from the audio data supply apparatus 3 is received by the communication unit 204 of the speaker apparatus 2. After the communication unit 204 subjects the audio data to the demodulation processing, the error correction processing, and the like, the audio data is converted into analog format by the D/A function of the SoC 201. The audio data converted into analog format is supplied to the amplifier 203 in accordance with the control of the SoC 201 and amplified by the amplifier 203. Sounds such as music and voice corresponding to the amplified audio data are output from the speaker unit SU.

[Effects]

As described above, according to the first embodiment described above, each positional relationship among the speaker apparatuses in the up-down direction can be grasped. Herein, by combining the detected positional information (spatial position information) on the speaker apparatuses in the height direction and the positional information regarding the speaker apparatuses in the left-right direction to be utilized, the audio data on the corresponding channel can be allocated to the speaker apparatus properly.

2. Second Embodiment

Next, a second embodiment will be described. Note that the items described in the first embodiment can be applied to the second embodiment unless otherwise specified. For example, the configurations of the speaker apparatuses 2 and the audio data supply apparatus 3 described in the first embodiment can be applied to the second embodiment.

[Patterns of Arrangement Positions of Speaker Apparatuses in Height Direction]

The second embodiment will be schematically described. In the second embodiment, arrangement positions of speaker apparatuses 2 in the height direction are patterned by utilizing distance information to a detection object above and distance information to a detection object below, which are obtained by transmission/reception units 24 and 25. In the following description, the pattern to which the arrangement position in the height direction, which is one of the positional information, belongs is referred to as an arrangement pattern as appropriate.

Figure 6:
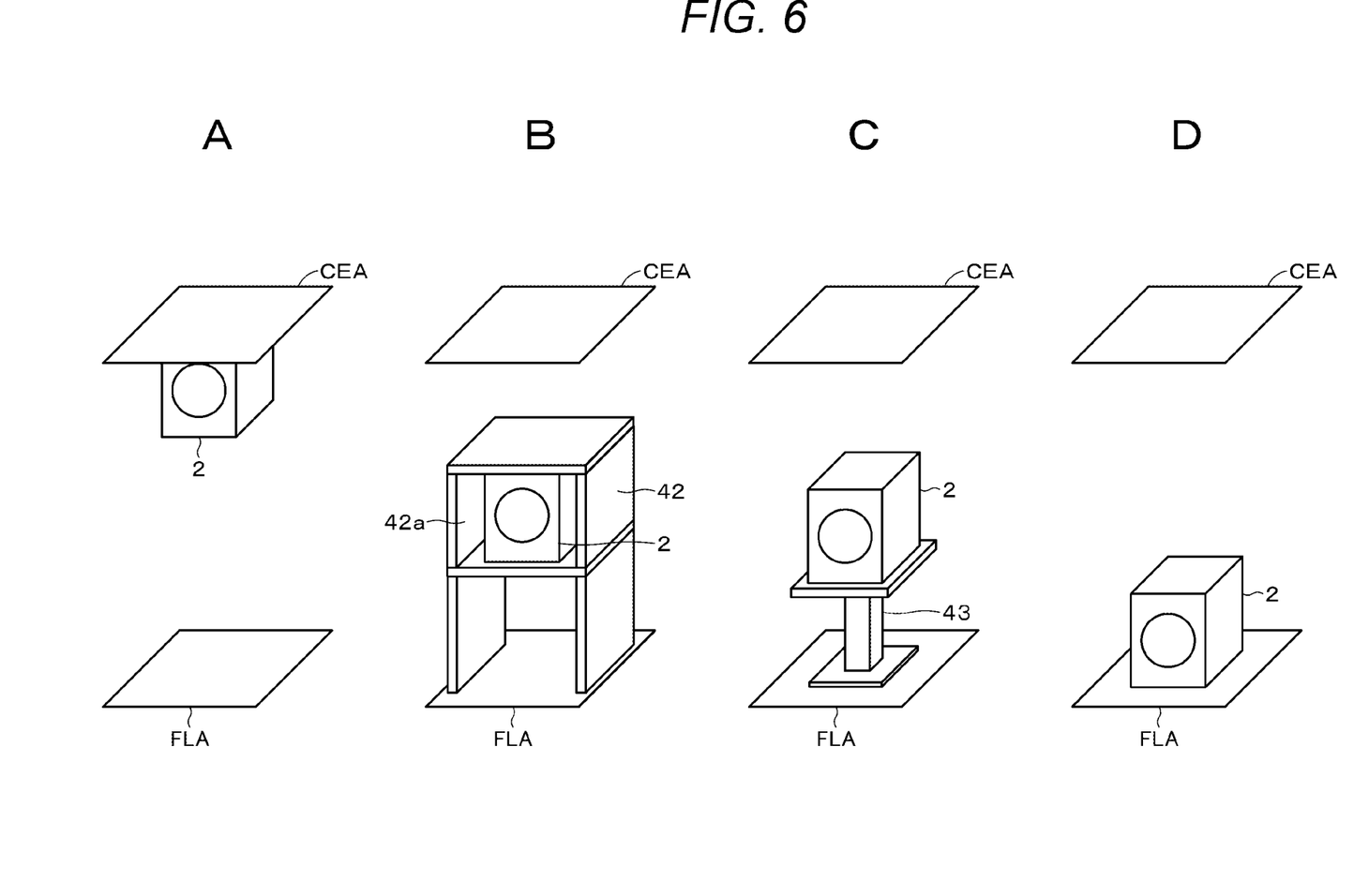
FIGS. 6A to 6D are diagrams for explaining patterns classified according to the arrangement position of the speaker apparatus in the height direction.

As one example, the arrangement position of the speaker apparatus 2 in the height direction is classified into four patterns as shown in FIG. 6. The arrangement pattern shown in FIG. 6A is a pattern in which the speaker apparatus 2 is installed at a ceiling CEA. Hereinafter, this arrangement pattern is referred to as a pattern A as appropriate. The arrangement pattern shown in FIG. 6B is a pattern in which the speaker apparatus 2 is housed in a housing space 42a of a rack 42. Hereinafter, this arrangement pattern is referred to as a pattern B as appropriate. The arrangement pattern shown in FIG. 6C is a pattern in which the speaker apparatus 2 is put on a speaker table (stand) 43. Hereinafter, this arrangement pattern is referred to as a pattern C as appropriate. The arrangement pattern shown in FIG. 6D is a pattern in which the speaker apparatus 2 is put on a floor face FLA. Hereinafter, this pattern is referred to as a pattern D as appropriate.

[Operation Example of Speaker Apparatus]

Figure 7:
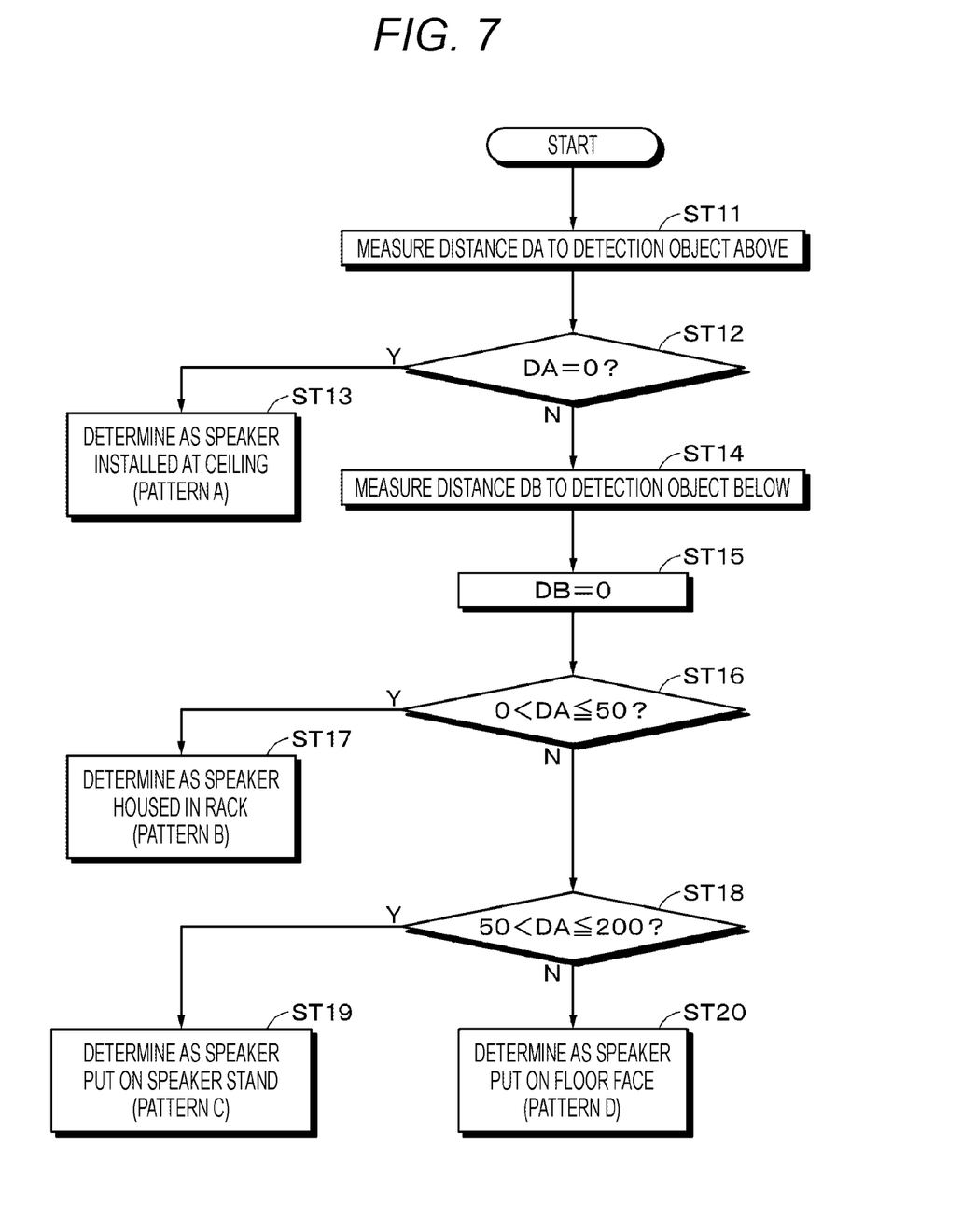
FIG. 7 is a flowchart showing a flow of processing executed by a speaker apparatus according to a second embodiment.

Next, an operation example of the speaker apparatus 2 according to the second embodiment will be described with reference to the flowchart shown in FIG. 7. In Step ST11, the transmission/reception unit 25 is operated to measure a distance DA to a detection object positioned above the speaker apparatus 2. As a method of measuring the distance, for example, the measuring method described in the first embodiment can be applied. Then, the processing proceeds to Step ST12.

In Step ST12, determined is whether or not the distance DA=0. If the distance DA=0, the processing proceeds to Step ST13. The fact that the distance DA=0 means that there is no distance to the detection object above. Thus, in Step ST13, the speaker apparatus 2 is determined to be a speaker apparatus installed at the ceiling CEA or in the vicinity thereof, and the arrangement pattern of the speaker apparatus 2 in the height direction is classified as the pattern A. Note that the processing of determining the arrangement position of the speaker apparatus 2 and applying the arrangement position to the pattern is performed by, for example, a SoC 201.

In a case where the distance DA=0 is not established by the determination processing in Step ST12, the processing proceeds to Step ST14. In Step ST14, the transmission/reception unit 24 is operated to measure a distance DB to a detection object below. Note that the processing in Step ST14 may be performed in Step ST11. Then, the processing proceeds to Step ST15.

In a case where the speaker apparatus 2 is not installed at the ceiling CEA (in a case where the distance DA≠0), the speaker apparatus 2 is physically placed on any plane. Thus, the distance DB=0. Then, the processing proceeds to Step ST16.

In Step ST16, determined is whether or not 0<DA≤50 (in cm). In a case where 0<DA≤50, the processing proceeds to Step ST17. The case where 0<DA≤50 is established is a case where the speaker apparatus 2 is placed on a plane and there is a certain distance (gap) between a top face 2a of the speaker apparatus 2 and the detection object above. It is rare for the height of the housing space 42a of the rack 42, in which the speaker apparatus 2 is housed, to exactly match the height of the speaker apparatus 2, and there is usually a gap of a certain degree (50 cm or less in this example). Therefore, in a case where 0<DA≤50 is established in Step ST17, the speaker apparatus 2 is determined to be a speaker apparatus housed in the rack 42, and the arrangement pattern of the speaker apparatus 2 is classified as the pattern B.

In a case where 0<DA≤50 is not established by the determination processing in Step ST16, the processing proceeds to Step ST18. In Step ST18, determined is whether or not 50<DA≤200. In a case where 50<DA≤200, the processing proceeds to Step ST19.

The height of the speaker table 43 is typically 50 to 100 cm. Assuming that the average height of a listening room is 250 cm, the height from the speaker apparatus 2 put on the speaker table 43 to the ceiling CEA is about 100 to 180 cm. Therefore, in a case where 50<DA≤200 is established in Step ST18, the speaker apparatus 2 is determined to be a speaker apparatus put on the speaker table 43, and the arrangement pattern of the speaker apparatus 2 is classified as the pattern C.

In a case where 50<DA≤200 is not established by the determination processing in Step ST18, the processing proceeds to Step ST20. In Step ST20, since the distance between the top face 2*a* of the speaker apparatus 2 and the detection object above is greater than 200 cm, it is determined that the detection object is the ceiling CEA and the speaker apparatus 2 is a speaker apparatus put on the floor face FLA. Then, the arrangement pattern of the speaker apparatus 2 is classified as the pattern D.

The SoC 201 of the speaker apparatus 2 transmits the arrangement pattern to the audio data supply apparatus 3 by using a communication unit 204. The audio data supply apparatus 3 subjects audio data to sound quality adjustment processing in accordance with the arrangement pattern transmitted from the speaker apparatus 2. The sound quality adjustment processing is performed by a DSP 311 of the audio data supply apparatus 3.

For example, in the case of the pattern A, the level of a high frequency band (e.g., a frequency band greater than 4 kHz) is increased by the equalizer function of the DSP 311 in order to enhance directivity. In the case of the pattern B, there is a possibility that the reproduced sound stagnates in the housing space 42*a* of the rack 42. Thus, the level of a low frequency band (e.g., a frequency band less than 100 Hz) is decreased, and the level of the high frequency band is increased in order to enhance directivity. In the case of the pattern C, there is a possibility that a massive feeling of the sound caused by the low frequency band is deteriorated. Thus, the level of the low frequency band is increased. Furthermore, in the case of the pattern D, the level of the low frequency band is dropped in order to prevent the sound of the low frequency band from rumbling on the floor face FLA. Note that shift amounts of the levels can be set appropriately. Furthermore, depending on the arrangement pattern, the sound quality adjustment processing does not have been performed on the audio data.

Note that the audio data to be subjected to the sound quality adjustment processing may be audio data on a channel corresponding to the arrangement position as described in the first embodiment. In a case where the audio data is in monaural format, the audio data to be subjected to the sound quality adjustment processing may be the same (one channel) audio data for all the speaker apparatuses 2.

The audio data subjected to the sound quality adjustment processing by the DSP 311 is transmitted to the corresponding speaker apparatus 2 via the communication unit 308. Then, after the audio data received by the communication unit 204 of the speaker apparatus 2 has been subjected to demodulation processing, error correction processing, and the like, the audio data is converted into analog format by the D/A function of the SoC 201. The audio data converted into analog format is supplied to the amplifier 203 in accordance with the control of the SoC 201 and amplified by the amplifier 203. Sounds such as music and voice corresponding to the amplified audio data are output from the speaker unit SU.

[Effects]

According to the second embodiment described above, by measuring the distances to the detection objects in the up-down direction, it is possible to set the optimum sound quality according to the distances to the detection objects. Therefore, it is possible to provide a user with a better reproduced sound.

3. Modification Examples

Although the plurality of embodiments of the present disclosure has been specifically described above, the contents of the present disclosure are not limited to the above-described embodiments, and various modifications are possible based on the technical idea of the present disclosure.

In the above-described embodiments, the audio data supply apparatus 3 may have, for example, an amplifier, a speaker and the like, and the audio data supply apparatus 3 may function as a speaker apparatus.

The distance information regarding the left, right, up and down detection objects may be transmitted from each of the speaker apparatuses 2 to the audio data supply apparatus 3, and the arrangement positions and arrangement patterns of the speaker apparatuses 2 may be determined by the audio data supply apparatus 3 (e.g., CPU 301). Furthermore, audio data on all channels may be supplied from the audio data supply apparatus 3 to each of the speaker apparatuses 2, and the speaker apparatuses 2 may select the audio data on the channels according to the arrangement positions. Moreover, the speaker apparatus 2 may be configured to have a sound quality adjustment processing function (e.g., the function equivalent to the DSP 311) for the audio data, and the speaker apparatus 2 may perform the sound quality adjustment processing on the audio data according to the arrangement pattern.

The thresholds in the processing of the above-described second embodiment are examples and not limited. In consideration of the height of mechanical attachment parts when the speaker apparatus 2 is attached to the ceiling CEA, the height of the protective member that protects the floor face FLA when the speaker apparatus 2 is put thereon, and the like, the threshold used in Step ST12 may be other than zero as long as the threshold is substantially zero, such as zero or near zero.

Moreover, the thresholds in the processing (e.g., the processing in Steps ST16 and ST18) of the second embodiment may be dynamically changed. For example, the speaker apparatus 2 is placed on the floor face FLA, and the height to the ceiling CEA of the listening room is measured once by using the transmission/reception unit 25. The optimum thresholds may be set according to the measuring results. Alternatively, the speaker apparatus 2 may store the height of itself, and the thresholds may be set on the basis of that height and the measured height to the ceiling CEA of the listening room.

Arrangement patterns different from the above-described arrangement patterns may be set. For example, in a case where both the distance DA and the distance DB are within a certain range, the speaker apparatus 2 may be identified as being installed at the wall face. This range can be typically set on the basis of the height of the speaker apparatus installed at the wall face. Then, an arrangement pattern may be allocated to the speaker apparatus 2 installed at the wall face, and the optimum sound quality adjustment processing may be performed according to the arrangement pattern. In a case where the speaker apparatus 2 is identified as being installed at the wall face, for example, the sound quality adjustment processing similar to that of the pattern C may be performed.

As the sound quality adjustment processing in the second embodiment, processing of changing the level of an intermediate frequency band (e.g., 100 Hz to 4 kHz) may be performed. As another processing, known processing of changing a volume, or the like may be performed. The sound quality adjustment processing may be performed according to the respective distances to the detection objects existing above and below without the classification of the arrangement patterns.

Figure 8:
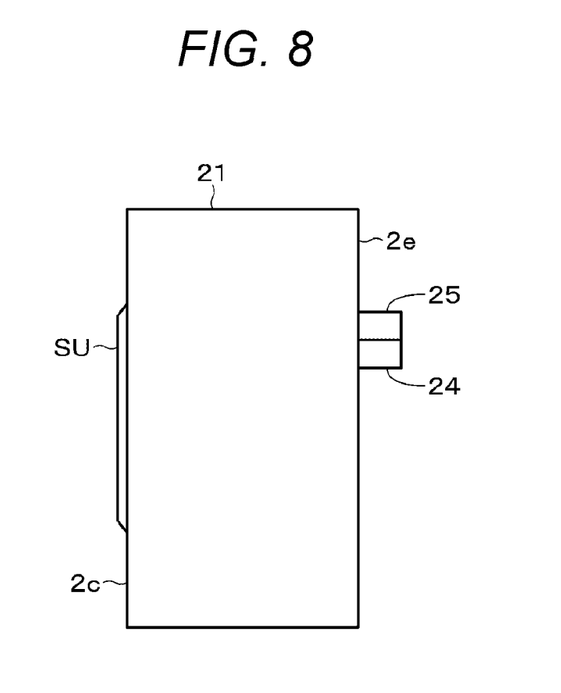
FIG. 8 is a view for explaining a modification example.

The positions at which the transmission/reception units 24 and 25 are provided can be changed as appropriate. For example, as shown in FIG. 8, transmission/reception units 24 and 25 may be provided on a side face 2e opposite to a side face 2c to which a speaker unit SU is attached. With this configuration, in a case where a speaker apparatus 2 is put on a speaker table 43, an infrared signal $IR_D$ can be prevented from being blocked by the pedestal of the speaker table 43 as much as possible, and a distance to a detection object below (e.g., a floor face FLA) can be accurately calculated. Then, the speaker apparatus 2 can be accurately identified as being put on the speaker table 43 according to the calculated distance.

The configurations, methods, steps, shapes, materials, numerical values, and the like listed in the above-described embodiments are merely examples, and different configurations, methods, steps, shapes, materials, numerical values, and the like may be used as necessary. The above-described embodiments and modification examples can be combined as appropriate.

The present disclosure can also adopt the following configurations.

(1)

A speaker apparatus including a measuring unit configured to measure a first distance to a detection object, the detection object existing on one side in a vertical direction substantially orthogonal to a sound radiation direction, and a second distance to a detection object, the detection object existing on another side in the vertical direction.

(2)

The speaker apparatus according to (1), further including a communication unit configured to send positional information based on the first distance and the second distance to another apparatus by communication.

(3)

The speaker apparatus according to (2), in which the positional information is information indicating an arrangement pattern of the speaker apparatus in the vertical direction, and the speaker apparatus further includes an identification unit configured to identify the arrangement pattern on the basis of the first distance and the second distance.

(4)

The speaker apparatus according to (3), in which the identification unit identifies the arrangement pattern according to a range of a distance to which the second distance belongs, in a case where the first distance is substantially zero.

(5)

The speaker apparatus according to (4), in which the identification unit determines that the arrangement pattern is a pattern in which the speaker apparatus is arranged at a ceiling face or in a vicinity thereof, in a case where the second distance substantially zero.

(6)

The speaker apparatus according to any one of (3) to (5), further including a sound quality adjustment processing unit configured to perform sound quality adjustment processing for the arrangement pattern.

(7)

The speaker apparatus according to any one of (1) to (6), further including a rectangular parallelepiped enclosure, in which a speaker unit is provided at a first face of the enclosure, a first transmission/reception unit configured to output and receive a signal for obtaining the first distance is provided at a bottom face substantially orthogonal to the first face, and a second transmission/reception unit configured to output and receive a signal for obtaining the second distance is provided at a top face facing the bottom face.

(8)

The speaker apparatus according to any one of (1) to (6), further including a rectangular parallelepiped enclosure, in which a speaker unit is provided at a first face of the enclosure, and a first transmission/reception unit configured to output and receive a signal for obtaining the first distance and a second transmission/reception unit configured to output and receive a signal for obtaining the second distance are provided at a second face opposite to the first face.

(9)

An audio data supply apparatus including:

an audio data processing unit configured to subject audio data to sound quality adjustment processing according to positional information sent from a speaker apparatus; and a supply unit configured to supply the audio data subjected to the sound quality adjustment processing to a corresponding speaker apparatus by communication, in which the positional information is information based on a first distance to a detection object, the detection object existing on one side in a vertical direction substantially orthogonal to a sound radiation direction of the speaker apparatus, and a second distance to a detection object, the detection object existing on another side in the vertical direction.

(10)

An audio data reproduction system including:

a speaker apparatus; and an audio data supply apparatus configured to supply audio data to the speaker apparatus, in which the speaker apparatus includes a measuring unit configured to measure a first distance to a detection object, the detection object existing on one side in a vertical direction substantially orthogonal to a sound radiation direction, and a second distance to a detection object, the detection object existing on another side in the vertical direction, and a communication unit configured to send positional information based on the first distance and the second distance to the audio data supply apparatus by communication, and the audio data supply apparatus includes an audio data processing unit configured to subject the audio data to sound quality adjustment processing according to the positional information sent from the speaker apparatus, and a supply unit configured to supply the audio data subjected to the sound quality adjustment processing to a corresponding speaker apparatus by communication.

REFERENCE SIGNS LIST

1 Audio data reproduction system
2 Speaker apparatus
2a Top face
2b Bottom face
3 Audio data supply apparatus
21 Enclosure
24, 25 Transmission/reception unit
201 SoC
204 Communication unit
308 Communication unit
311 DSP
SU Speaker unit

What is claimed is:

1. A speaker apparatus comprising a measuring unit configured to measure a first distance to a first detection object, the first detection object existing on one side in a vertical direction substantially orthogonal to a sound radiation direction, and a second distance to a second detection object, the second detection object existing on the one side in the vertical direction substantially orthogonal to the sound radiation direction at a greater distance than the first distance, wherein the first and second detection objects are not speaker apparatuses.

2. The speaker apparatus according to claim 1, further comprising a communication unit configured to send positional information based on the first distance and the second distance to another apparatus by communication.

3. The speaker apparatus according to claim 2,
wherein the positional information is information indicating an arrangement pattern of the speaker apparatus in the vertical direction, and
the speaker apparatus further comprises an identification unit configured to identify the arrangement pattern on a basis of the first distance and the second distance.

4. The speaker apparatus according to claim 3, wherein the identification unit identifies the arrangement pattern according to a range of a distance to which the second distance belongs, in a case where the first distance is substantially zero.

5. The speaker apparatus according to claim 4, wherein the identification unit determines that the arrangement pattern is a pattern in which the speaker apparatus is arranged at a ceiling face or in a vicinity thereof, in a case where the second distance is substantially zero.

6. The speaker apparatus according to claim 3, further comprising a sound quality adjustment processing unit configured to perform sound quality adjustment processing for the arrangement pattern.

7. The speaker apparatus according to claim 1, further comprising
a rectangular parallelepiped enclosure,
wherein a speaker unit is provided at a first face of the enclosure, a first transmission/reception unit configured to output and receive a signal for obtaining the first distance is provided at a bottom face substantially orthogonal to the first face, and a second transmission/reception unit configured to output and receive a signal for obtaining the second distance is provided at a top face facing the bottom face.

8. The speaker apparatus according to claim 1, further comprising
a rectangular parallelepiped enclosure,
wherein a speaker unit is provided at a first face of the enclosure, and a first transmission/reception unit configured to output and receive a signal for obtaining the first distance and a second transmission/reception unit configured to output and receive a signal for obtaining the second distance are provided at a second face opposite to the first face.

9. An audio data supply apparatus comprising:
an audio data processing unit configured to subject audio data to sound quality adjustment processing according to positional information sent from a speaker apparatus; and
a supply unit configured to supply the audio data subjected to the sound quality adjustment processing to a corresponding speaker apparatus by communication,
wherein the positional information is information based on a first distance to a first detection object, the first detection object existing on one side in a vertical direction substantially orthogonal to a sound radiation direction of the speaker apparatus, and a second distance to a second detection object, the second detection object existing on the one side in the vertical direction substantially orthogonal to the sound radiation direction at a greater distance than the first distance, wherein the first and second detection objects are not speaker apparatuses.

10. An audio data reproduction system comprising:
a speaker apparatus; and an audio data supply apparatus configured to supply audio data to the speaker apparatus,
wherein the speaker apparatus includes
a measuring unit configured to measure a first distance to a first detection object, the first detection object existing on one side in a vertical direction substantially orthogonal to a sound radiation direction, and a second distance to a second detection object, the second detection object existing on the one side in the vertical direction substantially orthogonal to the sound radiation direction at a greater distance than the first distance, wherein the first and second detection objects are not speaker apparatuses, and
a communication unit configured to send positional information based on the first distance and the second distance to the audio data supply apparatus by communication, and
the audio data supply apparatus includes
an audio data processing unit configured to subject the audio data to sound quality adjustment processing according to the positional information sent from the speaker apparatus, and
a supply unit configured to supply the audio data subjected to the sound quality adjustment processing to a corresponding speaker apparatus by communication.

11. The audio data supply apparatus according to claim 9, wherein the audio data supply apparatus sends the audio data subjected to the sound quality adjustment processing to the corresponding speaker apparatus by wired or wireless communication.

12. The audio data supply apparatus according to claim 11, wherein the wireless communication includes Wi-Fi technology or Bluetooth technology.

13. The audio data supply apparatus according to claim 9, wherein the audio data supply apparatus further includes speaker capabilities.

* * * * *